United States Patent [19]

Muralidhara et al.

[11] Patent Number: 4,561,953

[45] Date of Patent: Dec. 31, 1985

[54] SOLID-LIQUID SEPARATION PROCESS FOR FINE PARTICLE SUSPENSIONS BY AN ELECTRIC AND ULTRASONIC FIELD

[75] Inventors: Harapanahalli Muralidhara, Dublin, Ohio; Bhupendra Parekh, Cypress, Tex.; Nagabhusan Senapati, Dublin, Ohio

[73] Assignee: Battelle Memorial Institute, Columbus, Ohio

[21] Appl. No.: 622,422

[22] Filed: Jun. 20, 1984

Related U.S. Application Data

[63] Continuation of Ser. No. 504,780, Jun. 16, 1983, abandoned.

[51] Int. Cl.[4] .............................................. B01D 13/02
[52] U.S. Cl. ........................... 204/182.3; 204/157.1 S; 204/301; 204/180.1
[58] Field of Search ............... 204/180 R, 186, 299 R, 204/300 R, 301, 302, 157.1 S; 210/785

[56] References Cited

U.S. PATENT DOCUMENTS

| | | | |
|---|---|---|---|
| 2,470,741 | 5/1949 | Gordon | 204/157.1 S |
| 2,744,860 | 5/1956 | Rines | 204/157.1 S |
| 3,468,778 | 9/1969 | Hirs et al. | 204/180 R |
| 3,864,249 | 2/1975 | Wallis | 210/19 |
| 4,003,819 | 1/1977 | Kunkle et al. | 204/301 |
| 4,028,232 | 6/1977 | Wallis | 210/380.3 |
| 4,090,937 | 5/1978 | Stoev et al. | 204/180 R |
| 4,101,400 | 7/1978 | Pepping | 204/300 R |
| 4,244,804 | 1/1981 | Moeglich | 204/180 R |

FOREIGN PATENT DOCUMENTS 3142987 12/1978 Japan .
WO80/00226 2/1980 PCT Int'l Appl. .

OTHER PUBLICATIONS

Neville C. Lockhart; Sedimentation and Electro-Osmotic Dewatering of Coal Washery Slimes, Fuel, vol. 60, (Oct. 1981) pp. 919–923.
H. V. Fairbanks, et al; Acoustic Drying of Coal, IEEE Trans. on Sonics and Ultrasonics, vol. Su-14, No. 4 (Oct. 1967) pp. 175–177.
H. V. Fairbanks, et al; Acoustic Drying of Ultrafine Coals, Ultrasonics, vol. 8, No. 3 (Jul. 1970) pp. 165–167.

*Primary Examiner*—Andrew H. Metz
*Assistant Examiner*—B. J. Boggs, Jr.
*Attorney, Agent, or Firm*—Klaus H. Wiesmann

[57] ABSTRACT

A method of dewatering an aqueous suspension by concurrently subjecting the aqueous suspension to the action of a sonic or ultrasonic field and an electrical field so as to remove the water from the suspension. The suspension is moved into a dewatering chamber between opposing electrodes one of which is permeable to water. The sonic or ultrasonic field is then applied to the suspension concurrently with the electrical field, at a frequency and amplitude adapted to cause water to separate from the suspension particles. The concurrently applied electrical field between the electrodes causes the particles to migrate away from the permeable electrode and water to migrate toward the permeable electrode. Water is then removed through the permeable electrode. The method requires less energy to remove a unit of water, has a faster rate of water removal and achieves a lower moisture content than if only an electrical field or acoustical field were used separately or in sequence.

32 Claims, 4 Drawing Figures

SOLID-LIQUID SEPARATION PROCESS FOR FINE PARTICLE SUSPENSIONS BY AN ELECTRIC AND ULTRASONIC FIELD

The present invention is a continuation in part of U.S. patent application Ser. No. 6-504,780 filed June 16, 1983 entitled "Dewatering Process", now abandoned.

FIELD OF THE INVENTION

This invention relates to a method of concentrating the finely divided solids in colloidal suspensions, sludges or fine particle slurries in water by a combination of an electrical field, and an acoustical (sonic or ultrasonic) field and removing the water therefrom. Such sludges and slurries occur, for example, in coal washery slimes, ore processing, transportation of coal by pipeline and in production of ceramics. The method requires less energy for the combination of electrical field and acoustical field to remove a unit of water from a suspension than the energy required if only an electrical field or an acoustical (sonic or ultrasonic) field were used separately or in sequence to remove that unit of water from the equivalent slurry.

The method is of utility in removing water from the above mentioned examples and from those described below.

BACKGROUND OF THE INVENTION

Conventional methods of separating water from suspensions, sludges and slurries to improve their solid concentration include mechanical dewatering methods such as centrifugation, vacuum filtration, vibration screening; thermal drying; ponding; ultrasonic dewatering; and use of an electrical field (electrophoretic or electromotic dewatering. Some materials mixed with water, however, are not amenable to the usual dewatering methods due to blockage of the filter by fine particles so that the rate of filtration slows down significantly. In addition dewatering of colloidal and small particle suspensions is difficult with conventional solid-liquid separation techniques such as vacuum filtration or centrifugation. Such suspensions and slurries can also be thermally dried; but, the energy consumption is very high and it creates problems with dust. In addition natural settling by ponding requires large land areas for lagoons and the like.

Because of the high cost of energy there has been a renewed effort to reappraise all of the above methods and reduce the cost associated therewith. The use of an electrical field or acoustical field to separate water from suspended particles has been studied as further discussed below.

When colloidal particles such as finely divided clay are suspended in water they become charged and when subjected to an electrical field they will migrate towards one or another of the electrodes. The charge will depend on the type of suspension or slurry, e.g. certain types of clay become positively charged while many coals become negatively charged, thus the proper electrode polarity will need to be chosen to cause migration of particles away from the water permeable electrode and toward the impermeable electrode.

The application of an electrical field can agglomerate particles by neutralizing charges, dehydrate solids by electroosmosis, or cause the particles to migrate as noted above. The electrically charged collecting plates will sequester all migrating particles such as negatively or positively charged particles but do not collect the isoelectric particles. For example, in proteins, the charges originate from the ionization of ($COO^-$) and $NH_3+$) ions. The net charge on protein will depend on the number of these groups; the disassociation constant, pH, temperature, etc. However, it is an empirical observation that most colloidal protein suspensions are usually negatively charged under normal conditions when in water.

Another phenomenon present is that of electroosmosis. Electroosmosis is the transport of the liquid medium alongside a surface that is electrically charged but stationary. The movement of the liquid medium is in the direction of the electrode with the same sign of charge as the immovable surface. Thus, as the slurry particles become more densely packed and immovable, the water between the particles will be subject to electroosmotic forces. If the particles are negatively charged, the flow of water will be toward the negative electrode. Since this electrode will also be permeable to water, the dewatering process will be further improved.

Illustrative of the use of an electrical field in the dewatering of coal washery slimes is the article by Neville C. Lockhart, *Sedimentation and Electro-osmotic Dewatering of Coal Washery Slimes*, Fuel, Vol. 60, October, pp. 919–923.

The use of ultrasonic energy separately to dewater coal is known, as illustrated in the articles by H. V. Fairbanks et al., *Acoustic Drying of Coal*, IEEE Trans. on Sonics and Ultrasonics. Vol. SU-14, No. 4, (October 1967), pp. 175–177; *Acoustic Drying of Ultrafine Coals*, Ultrasonics, Vol. 8, No. 3 (July 1970), pp. 165–167.

Sonic or ultrasonic energy is a form of mechanical vibratory energy. Sonic or ultrasonic energy propagates as waves through all material media including solids, liquids and gases at characteristic velocities. The wave velocity is a function of the elastic and the inertial properties of the medium.

During the propagation of these waves in a medium very high inertial and elastic forces are generated locally due to the high frequency of these waves. The amplitude of particle motion in the medium due to the sonic and ultrasonic waves range from a few micro inches to 5 milliinches (0.005 inch) (0.127 mm) depending on the power level. The peak acceleration developed in the medium due to an ultrasonic wave at 20,000 Hertz and an amplitude of 0.001 inch (0.024 mm) is as high as 40,000 $G(1.5 \times 10^6$ inch/sec$^2$) $(3.810 \times 10^7$ mm/sec$^2$). One $G(9.807 \times 10^3$ mm/sec$^2$) is the acceleration due to gravity. The forces generated due to these levels of acceleration are very high.

For any medium these high inertia forces generated due to the sonic or ultrasonic waves can cause material failure, disruption and separation. The sonic or ultrasonic impedance of different materials, especially in solid and liquid phases are different by factors of 3 to 8. If the medium is a mixture of different phases of two or more types of materials such as water and coal, etc., the inertia and elastic forces between them are likely to be even higher. These high inertial and elastic forces are likely to break the surface tension and promote separation of liquid from solids.

In liquids a high level of sonic and ultrasonic energy is also known to cause cavitation, a phenomenon of micro bubble formation due to degassing and change of phase to vapors. In the presence of solid particulate matter, the level of cavitation is higher. The micro bubbles are formed on the surface of the solids and assist in the separation of the solid and liquid due to the formation of gas liquid surfaces with much lower surface energy compared to solid liquid surface. Cavitation also generates high local shock waves and in some cases charged free radicals. Shock waves and free radicals are likely to accelerate liquid solid separation.

High oscillatory forces are developed in a medium due to the application of ultrasonic energy. These high oscillatory forces between the solid media and water in a mixture and ultrasonic cavitation are believed to be the major mechanisms of sonic and ultrasonic dewatering. Degassing, decrease of viscosity and decrease of surface tension due to ultrasonic vibration are other possible mechanisms.

Ultrasonic energy is also partially absorbed by the medium and is converted to heat. Internal heat generation and the consequent temperature rise will further decrease the viscosity and the surface tension of the fluid and facilitate its removal. Local temperature rise is also likely to increase the cavitation activity and accelerate the rate of fluid removal. Therefore internal heating due to the partial absorption of the ultrasonic energy has added benefits to accelerate fluid removal as in aqueous systems.

In U.S. Pat. Nos. 3,864,249 and 4,028,232 to Wallis, there are found teachings of the use of acoustical pressure waves and coupling them to a separation screen to facilitate separation of a liquid from material to be dried.

The use of an electrical field or acoustical energy separately requires a substantial amount of energy.

It is an object of this invention to remedy the above drawbacks by reducing the energy requirements for dewatering, by increasing the rate of dewatering over present methods and by lowering the final moisture content of the product. The inventor has discovered that a concurrent use of an acoustical field (sonic or ultrasonic), and an electrical field (electrophoresis/electroosmosis) gives unexpectedly improved results over an acoustical field acting alone or an electrical field acting alone in that:

1. this combination of concurrent use requires less energy than using either of the two alone;
2. this combination of concurrent use dewaters at a faster rate than using either of the two alone; and
3. this combination of concurrent use gives a lower final moisture content to the product than using either of these two alone or using both in sequence.

BRIEF DESCRIPTION OF THE INVENTION

In accordance with the present invention there is provided a method for separating water from solids in aqueous suspensions of solids e.g. coal slurries and other materials as further described below. The method comprises concurrently subjecting the suspension to an electrical field and an acoustical field (sonic or ultrasonic) so as to separate water bound to solid particles and cause a migration of the particles and water so as to form a region depleted of particles. Water is then withdrawn from the region depleted of particles, such as by mechanical means. The energy required for an incremental amount of separation is less with the combination of an electrical field and an acoustical field than for either of the two separately or in sequence.

DESCRIPTION OF THE INVENTION

Figure 1:
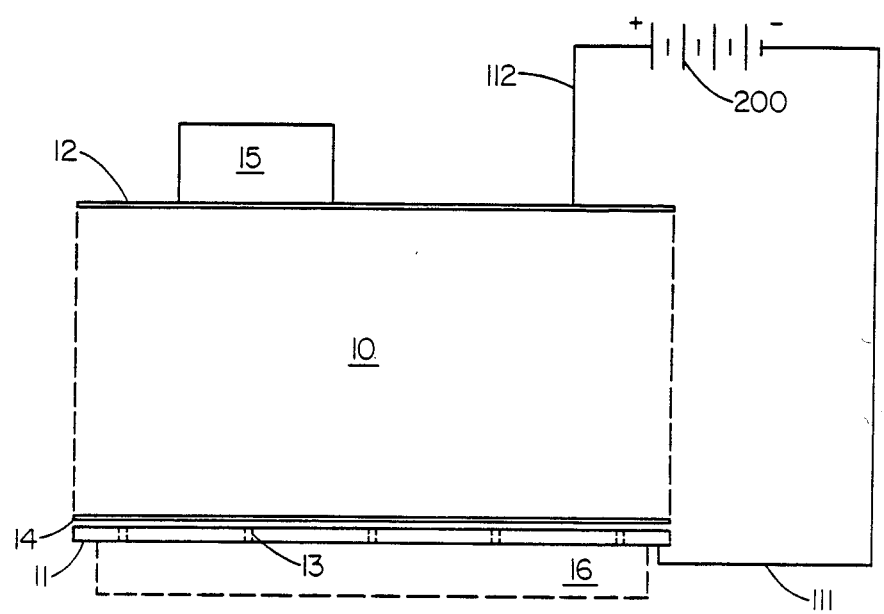
FIG. 1 illustrates, in semischematic form, a useful apparatus for the practice of the invention.

The drawing shows a dewatering zone or a chamber 10 bounded by electrodes 11 and 12 connected to an external supply 200 of direct current connected by electrical leads 111 and 112. Electrode 11 is water permeable with openings 13. A filter 14 may be employed if the electrode 11 does not have sufficiently small openings 13 to retain the particles in the suspension. An acoustical generating means 15 produces an acoustical field having sonic or ultrasonic waves (not illustrated) that are transferred throughout the mass of the suspension in the dewatering zone.

In operation, the suspension to be treated is moved into the dewatering zone 10 and subjected to the acoustical field (sonic or ultrasonic) of such a frequency and amplitude as to cause separation of water from the particles in the suspension. Concurrently, a D.C. voltage is applied between the electrodes 11 and 12 to cause migration of charged particles in the aqueous suspension away from the water permeable electrode 11 and toward the water impermeable electrode 12 and movement of water toward the permeable electrode.

Sonic or ultrasonic waves prevent packing of the suspended particles and facilitate flow of water toward the water permeable cathode. As the slurry passes through the dewatering zone the water is removed through the water permeable electrode 11 and the dewatered suspension emerges at the other end of the zone 10. Dewatering through the water permeable electrode 11 may be increased by augmentation means 16 such as by reducing the pressure outside the permeable electrode, by increasing the pressure within the zone or by a combination of the above. The process of the invention is operable without these augmentation means. It is preferred, however, that augmentation means be used. The means used for reducing the pressure at the outer surface of the permeable electrode or for increasing the pressure within the dewatering zone are those conventionally used for pressure reduction or increase for augmenting filtration.

The dewatering zone 10 may be bounded by two walls (not shown) that connect between the two electrodes 11 and 12 so as to contain the slurry within the zone 10. The walls are insulated from the electrode by insulating materials not shown or the walls may be of an electrically nonconductive material.

In this embodiment the electrical field and acoustical waves are applied concurrently while the suspension flows through the dewatering zone 10.

In other embodiments parameters for the electrical field and acoustical energy may be changed to remove additional water from the suspension by flowing it through additional apparatus of the kind illustrated in FIG. 1.

In still other embodiments the suspension may be pretreated or posttreated by acoustical energy or an electrical field separately before being subjected to the concurrent method of the invention.

The frequency of operation of the sonic/ultrasonic generator may be about 5,000 to 100,000 Hertz, but preferably about 20,000 to 40,000 Hertz so as to minimize the effects of audible noise on the work environment and to keep the efficiency at a high level. The amplitude of the sonic and ultrasonic waves can be any amplitude sufficient to separate water bound to particles but is preferably in the range of about 0.002 mm to 0.01 mm.

The applied voltage may be any voltage that will cause a sufficient electrical field and a current to flow so as to cause a migration of the charged particles and water so as to improve the dewatering process by reducing total energy requirements over the above mentioned methods used separately.

The method may be used with aqueous coal slurries such as those produced when coal is shipped by pipeline; coal washery slimes when coal is separated from contaminants after mining, suspensions produced in ore processing such as illmenite ore processing slurries or sludges or haematite ore processing slurries or sludges; clay suspensions produced in production of ceramics; fermentation and sewage sludges; and protein hydrolysates. It is believed that the method of the invention is generally applicable to the above listed sludges and slurries.

Dewatering may be further augmented by addition of small quantities of surface modifiers such as detergents or surfactants. Examples of these surface modifiers are polyacryl amide gels, polystyrene sulfonates and the like. The preferred amount is capable of being readily determined by those skilled in the dewatering art. These surfactants are to be added prior to the concurrent application of the acoustical and electrical fields. The types of surfactants could be nonionic, anionic or cationic types. The surfactants because of their hydrophobic nature attach to the coal surface and release the water.

Certain types of materials, when mixed with water, e.g. certain clays and coals, do not exhibit sufficient conductivity to allow for proper current flow during application of the electrical field. In this situation the conductivity of the mixture must be enhanced by the addition of a salt or conductive enhancer e.g. NaCl, KCl, KCl, $Na_2SO_4$, NaOH, KOH, $NH_4Cl$. The same effect can be achieved by changing the pH of the solution appropriately. This will insure proper current flow and migration of the particles.

The method may be used in the dewatering of any size particles mixed with water. The preferred particle size range is from about 10 micrometers to 100 micrometers.

According to the method of the present invention it is important that the sonic and ultrasonic waves and the electrical field be applied to the mass of the mixture so as to penetrate throughout the mixture itself. If the sonic and ultrasonic waves do not penetrate throughout the mixture to be dewatered, an efficient separation of water from the solids will not take place.

While the foregoing discussion and the following examples use a vacuum in combination with ultrasonic and electrical field dewatering it is to be understood that use of a vacuum is not mandatory and that other means 16 may be used to augment the dewatering process of the invention. Further, the following examples serve to illustrate and not limit the present invention. Unless otherwise indicated, all percentages are by weight.

Reference to a vacuum herein is in the colloquial sense only and is used to refer to the application of a reduced pressure (below atmospheric) to the samples.

Coal

A coal slurry with coal particles having a maximum Tyler mesh size of −200 was prepared and is that used for the tests of Examples 1 through 4.

The slurry was prepared using a dry coal to water ratio of 1:1 resulting in a slurry of fifty percent (50%) water by weight. About 0.1 g NaCl was added to all samples.

The particles were mixed with the water with a magnetic stirrer until a homogeneous suspension resulted.

EXAMPLE 1

This comparative example illustrates how much water is removed by usual vacuum filtration.

TABLE I

| | Dewatering by Vacuum Only | | |
|---|---|---|---|
| Sample | Time (min) | Vacuum (cm. of Hg) | % $H_2O$ |
| 1 | 1 | 51 | 44.46 |
| 2 | 4 | 38 (25" at 3 min) | 42.0 |
| 3 | 7 | 38 (13" at 6 min) | 39.0 |
| 4 | 10 | 38 (13" at 6 min) | 39.06 |

Sample size 35 g.

Figure 2:
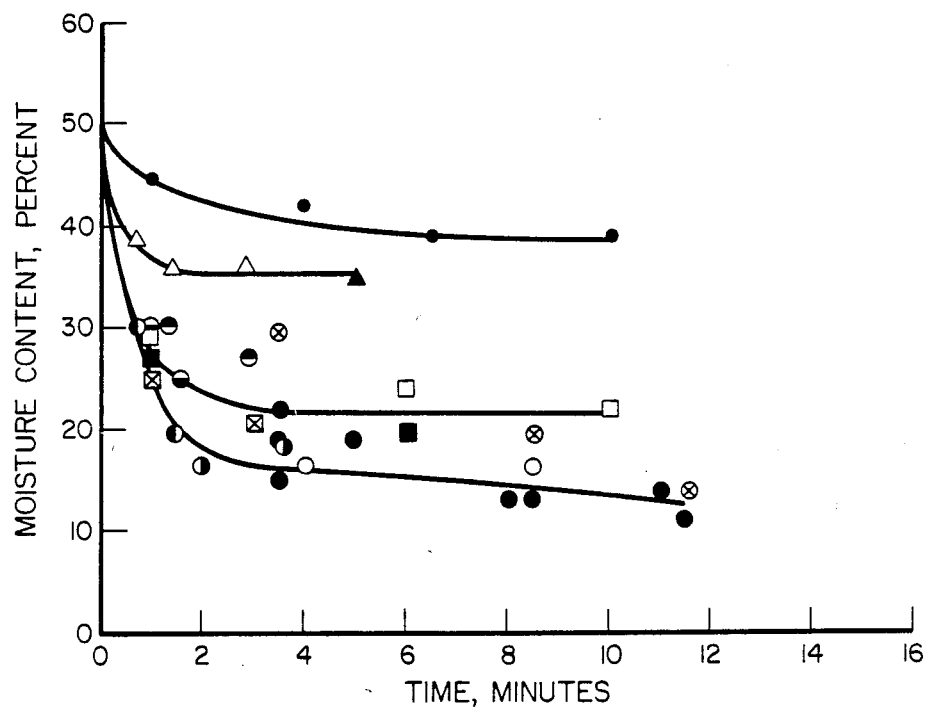
FIG. 2 presents a graph showing plotting of percent moisture in the samples versus time for the different methods.

This data is plotted for comparison in FIG. 2.

This initial experiment was performed with vacuum only using a typical water faucet aspirator. From FIG. 2 it can be observed that the solids concentration achieved after the first ten minutes levels off with little change thereafter. This is due to the formation of a cake which retards the rate of filtration. Also, the solids concentration obtained is rather low due to the limiting properties exhibited by the particles. The water held by surface tension forces, capillary forces, etc. is still being retained. The water removed is mostly bulk water. From past experience the results from 50 g samples would not deviate much from the results of the 35 g samples. Thus the above results are valid for comparison purposes.

EXAMPLE 2

This comparative example illustrates the use of an electrical field, (electrophoresis and electroosmosis) (E) and a vacuum. The slurry was the same as that prepared earlier. Sample size was 35 g for samples 1, 2, 3 and 50 g for samples 4, 5, 6.

TABLE II

| Sample | Vacuum (cm. of Hg) | Temp. °C. | Time (min) | E Initial Power Watts | E Energy Watt Hours | E Energy Corrected Watt Hours | Water Content % $H_2O$ |
|---|---|---|---|---|---|---|---|
| 1 | 38 | — | 0.7 | 12.5 | 0.141 | 0.0705 | 38.5 |
| 2 | 38 | — | 1.4 | 12.5 | 0.283 | 0.1415 | 35.6 |
| 3 | 38 | — | 2.9 | 12.5 | 0.567 | 0.283 | 36 |
| 4 | 38 | — | 5 | 78 | — | 1.365 | 34.8 |

TABLE II-continued

| Sample | Vacuum (cm. of Hg) | Temp. °C. | Time (min) | E Initial Power Watts | E Energy Watt Hours | E Energy Corrected Watt Hours | Water Content % H₂O |
|---|---|---|---|---|---|---|---|
| 5* | 38 | 100 | 4 | 120 | — | 2.127 | 27 |
| 6* | 38 | 100 | 4 | 220 | — | 3.201 | 28 |

Figure 4:
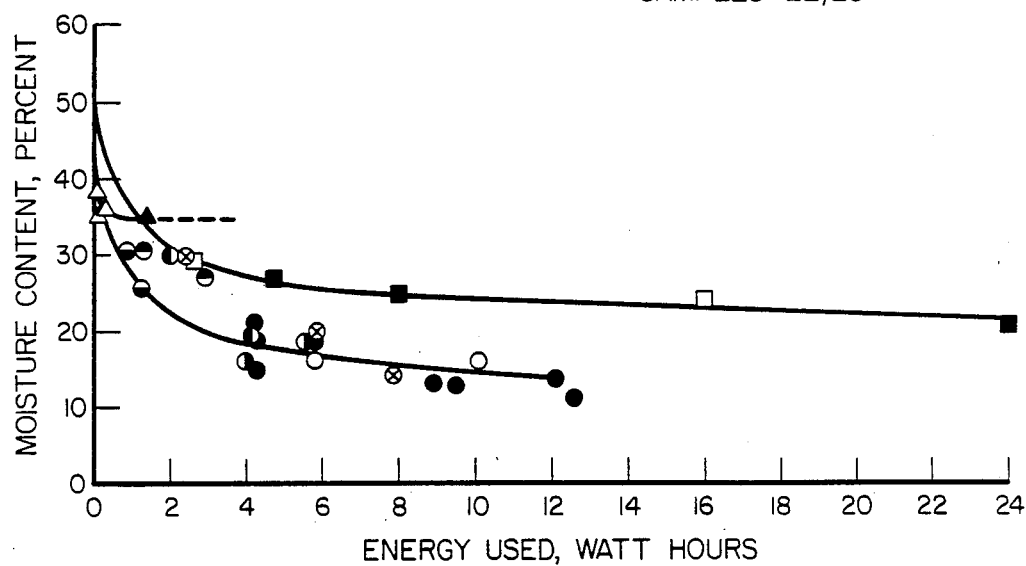
FIG. 4 presents a graph showing the percent moisture in the samples versus energy consumed.

*Samples not used in FIGS. 2 and 4 due to water loss from high temperature.

This example performed with an electrical field and a vacuum only gave improved performance over a vacuum alone. This is shown in FIG. 2. Using only a vacuum as in Example 1 the moisture content after two minutes was only about forty-three percent (43%). In the presence of an electrical field under similar conditions the moisture concentration was reduced to about thirty-five percent (35%). The time and power levels for samples 1, 2 and 3 have been corrected to those for a 50 g sample by a direct algebraic ration to allow direct comparison with 50 g samples from other tests.

Figure 3:
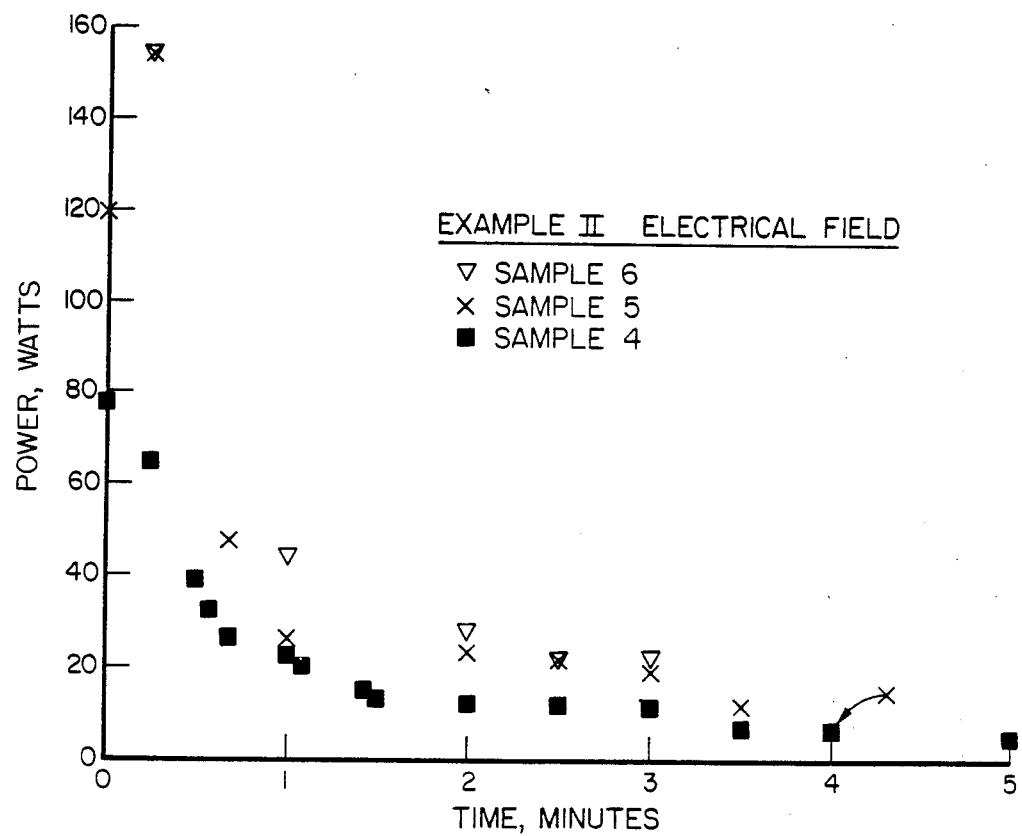
FIG. 3 presents a graph showing plotting of decrease in power used during application of an electrical field.

It was noted that the power used dropped rapidly as the dewatering process continued. This is shown in FIG. 3 for samples 4, 5, and 6. Thus for samples 1, 2, and 3 a first approximation that assumed that the power level was reduced linearly during the time the test was used. For samples 4, 5, and 6 the energy required was obtained by assuming a straight line between the data points and calculating the area under each curve.

At higher current throughput (1–2 amp) for longer periods of time, the electrodes became hot. Therefore the potential between electrodes was correspondingly decreased to allow smaller amounts of current flow.

EXAMPLE 3

Example 3 was a comparative example performed using only ultrasonics (U) and a vacuum. The slurry was the same as that prepared earlier. Sample size is 50 g. Frequency was 20,000 Hertz.

TABLE III

| Sample | Vacuum (cm. of Hg) | Temp. °C. | Time (min) | U Power Watts | U Energy Watt Hours | Moisture Content % H₂O |
|---|---|---|---|---|---|---|
| 1 | 64 | 25 | 1 | 160 | 2.67 | 29.0 |
| 2 | 30 | 36 | 6 | 160 | 16.0 | 24.0 |
| 3 | — | — | 10 | 160 | 26.7 | 22.0 |
| 4 | 53 | 56 | 1 | 280 | 4.67 | 26.7 |
| 5 | — | 68 | 6 | 280 | 28.0 | 19.3 |
| 6* | 66 | 96 | 10 | 280 | 46.7 | 5.2 |
| 7 | 61 | 42 | 1 | 480 | 8.0 | 24.8 |
| 8 | 58 | 74 | 3 | 480 | 24.0 | 20.5 |
| 9* | 56 | 91 | 6 | 480 | 48.0 | 17.3 |

*Samples not used due to high temperatures

By using ultrasonics and a vacuum, filtration rates were much higher than either vacuum alone or vacuum and an electrical field. As explained previously, dewatering in the presence of ultrasonic energy occurs mainly due to cavitation phenomena. At two minutes the solids concentration achieved is about twenty-three percent (23%) as compared to about thirty-five percent (35%) in the presence of the electrical field of Example 2. However it should be mentioned that there was generation of heat from the horn at longer experimental duration. In order to reduce this effect, an external cooling coil was used. The temperature of the slurry was constantly monitored by means of a thermocouple.

EXAMPLE 4

This example was performed using a combination of electrical field effects (electrophoresis/electroosmosis) (E), ultrasonics (U) and a vacuum. The slurry was the same as that prepared earlier. Sample size is 50 g except as noted in Table IV.

TABLE IV

| SAMPLE | VACUUM CM. OF Hg | TEMP. °C. | E TIME (MIN.) | U TIME (MIN.) | E POWER WATTS | U POWER WATTS | ENERGY TOTAL WH | ENERGY CORRECTED WH | MOISTURE % H₂O |
|---|---|---|---|---|---|---|---|---|---|
| 1 | 58.4 | — | 2 | 4 | 100 | 62.5 | 7.50 | 5.84 | 16.5 |
| 2 | 63.5 | 84 | 1.5 | 8.5 | 100 | 62.5 | 11.35 | 10.1 | 16.2 |
| 3ᵃ | 45.7 | 108 | 1.5 | 11.5 | 100 | 62.5 | 14.48 | 13.23 | 10.5 |
| 4 | 61 | 78 | 1.5 | 3.5 | 50 | 62.5 | 4.89 | 4.26 | 14.8 |
| 5 | 45.7 | 66 | 1.5 | 8.5 | 50 | 62.5 | 10.10 | 9.47 | 13.0 |
| 6 | 55.9 | — | 1.5 | 11.5 | 50 | 62.5 | 13.23 | 12.60 | 11.0 |
| 7 | 66.0 | 33 | 1.5 | 3.5 | 50 | 62.5 | 4.90 | 4.27 | 19.0 |
| 8 | 38.1 | — | 1.5 | 3.5 | 50 | 62.5 | 4.90 | 4.27 | 21.3 |
| 9 | 45.7 | — | 1.5 | 5.0 | 50 | 62.5 | 6.46 | 5.83 | 18.9 |
| 10 | 38.1 | — | 1.5 | 8.0 | 50 | 62.5 | 9.58 | 8.95 | 13.0 |
| 11 | 45.7 | — | 1.5 | 11.0 | 50 | 62.5 | 12.70 | 12.07 | 13.7 |
| 12 | 61.0 | 64 | 1.5 | 2.0 | 150 | 62.5 | 5.83 | 3.95 | 16.2 |
| 13 | 61.0 | 81 | 1.5 | 3.5 | 150 | 62.5 | 7.40 | 5.52 | 18.7 |
| 14ᵃ | 61.0 | 105 | 1.5 | 7.0 | 150 | 62.5 | 11.04 | 9.16 | 8.9 |
| 15 | 61.0 | 50 | 1.5 | 3.5 | 10 | 40 | 2.58 | 2.45 | 29.5 |
| 16 | 63.5 | 54 | 1.5 | 8.5 | 10 | 40 | 5.92 | 5.79 | 19.6 |
| 17 | 55.9 | 69 | 1.5 | 11.5 | 10 | 40 | 7.92 | 7.79 | 14.1 |
| 18 | — | — | 0.5 | 0.5 | 12.5 | 168 | — | — | 30 |
| 18**ᵇ | — | — | 0.71 | 0.71 | — | — | 2.143 | 2.07 | 30 |
| 19 | — | — | 1.0 | 1.0 | 12.5 | 168 | — | — | 19.5 |
| 19**ᵇ | — | — | 1.43 | 1.43 | — | — | 4.287 | 4.14 | 19.5 |
| 20 | 45.7 | — | [20 sec] [40 sec] | 1.0 | [42] | 25 | 0.83 | 30.4 | |

TABLE IV-continued

| SAMPLE | VACUUM CM. OF Hg | TEMP. °C. | E TIME (MIN.) | U TIME (MIN.) | E POWER WATTS | U POWER WATTS | ENERGY TOTAL WH | ENERGY CORRECTED WH | MOISTURE % H$_2$O |
|---|---|---|---|---|---|---|---|---|---|
| 21[c] | 45.7 | — | [10 sec] [50 sec] [30 sec] | 1.5 | [64] [16] [8] | 25 | 1.085 | 1.20 | 25.6 |
| 22[d] | 45.7 | — | [10 sec] [50 sec] | 1.0 | [15] [15] | 62.5 | 1.28 | 1.25 | 30.6 |
| 23[e] | 50.8 | — | [10 sec] [110 sec] | 2 | [15] [7] | 62.5 | 2.92 | 2.89 | 27 |

[a]Samples not used because of water loss due to high temperature.
[b]All data corrected to 50 g. Sample size was 35 g for samples 18 and 19.
[c]45 g sample corrected to 50 g.
[d]51 g corrected to 50 g.
[e]50.5 g corrected to 50 g.

The results of the combination of both electrical field and ultrasonics are shown in Table IV and FIGS. 2 and 4. The moisture concentration achieved in two minutes was about eighteen percent (18%) as opposed to about twenty-three percent (23%) by ultrasonics or about thirty-five percent (35%) by use of an electrical field. At comparable power inputs the same relationships were observed. For example the combination of electrical field and ultrasonics at 112.5 watts gave a liquid concentration of about fifteen percent (15) while that for electrophoresis alone at 120 watts and ultrasonics at 160 watts were much higher. At comparable power levels the rate of dewatering is also much higher.

FIG. 4 shows the variation of percent moisture content of the slurry or suspension versus energy consumed. The energy values for an electrical field alone and in combination have been corrected to reflect the reduction in energy used as the dewatering process proceeds. This correction has been made using a straight line approximation. The actual and corrected values are shown in the previous tables.

To achieve similar amounts of dewatering in the samples the combination of an electrical field and ultrasonics gave much lower values than either method alone. For example at four watt hours, the percent moisture content in the presence of an electrical field is about thirty-five percent (35%) while in the presence of ultrasonics it is about twenty-six percent (26%). The combination of both techniques concurrently; however, gives a much lower moisture content of about nineteen percent (19%).

These tables and figures show that the rate of dewatering, power consumption and ultimate solids content are superior for the combination of the techniques than the individual techniques.

The data further indicates that optimum separation is obtained when the energy input from the electrical field and acoustical field are approximately equal. Thus samples 15, 16, 17, 18, and 19 which have a much larger proportion of their energy input as ultrasonic energy initially give data similar to samples using only ultrasonics but gradually decrease to separation levels of the combination. Other samples, such as 1 through 13, 20, and 21, and where power levels for the two effects are more nearly equal give better results. Once knowing the teaching and advantages of the invention a person skilled in the art can readily determine the optimum power ratios to be used.

Vacuum figures in Example 1, samples 2, 3, and 4, Example 2, samples 1 through 6 and Example 4, sample 8 were lower than those for the remainder of the data. This is not believed to affect the results of the experiments in the the higher vacuum, above that used in the above cited samples will not give an increased dewatering rate or a final lower moisture content.

Temperatures were measured for some of the samples with a thermocouple.

Certain data points in the tables were not used in the graphs. These points exhibited higher temperatures in the slurry. It is believed their presentation would give unreliable or erroneous results for moisture content in that higher temperatures would cause water loss by vaporization. While a moderate temperature increase benefits the dewatering process as discussed earlier, excessive temperatures are generally avoided in that it is difficult to clearly demonstrate the significant differences of the process of utilizing a smaller amount of energy in dewatering coal with a combination of an electrical and ultrasonic field. Generally a temperature above 90° C. is deemed excessive.

Ceramic Slurry

EXAMPLE 5

A ceramic slurry was used for Example 5 with the results listed in Table V below. The ceramic slurry consisted of very fine clay particles in the order of 50–75 um in size.

The ceramic slurry is further characterized by having an initial solids content of 27%. Sample sizes were approximately 100 g. The voltage during electrophoresis was 50 volts for Samples 3–5 and 25 volts for Samples 6–8. Frequency of the ultrasonic energy applied was 20,000 Hertz.

The procedure differed slightly from that in Examples 1–4 in that acoustical energy was not applied initially but only after the slurry had begun to form a cake. Water was thus initially removed by vacuum or a combination of vacuum and electrophoresis. Acoustical energy was not applied until after cake formation because it was noted that application of acoustical energy did not improve the dewatering rates until a cake had begun to form. This is because the acoustical energy is not needed until unbound water has been removed and/or the slurry particles begin to clog the filter.

The figures given in Table V are those where it was determined that the dewatering rate had reached an asymptote and no further water could be removed. Table V lists the solids content using a vacuum (V) only (Sample 1), a vacuum (V) and ultrasonics (U) (Sample 2), a vacuum and electrophoresis (E) (Samples 3–6) and a combination of a vacuum (V), electrophoresis (E) and acoustics (U) (Samples 7–8).

It is apparent from Table V that by the use of a combination of electrophoresis and acoustics a higher total solids content can be achieved. Further, the same energy levels give a higher solids content for the combination of electrophoresic and acoustic means over either alone. Finally, for incremental water removal $W_R$, each milliliter of water removed for the combination required less energy than the use of either electrophoresic or acoustic means alone. In fact, ultrasonics alone was detrimental in that it did not improve dewatering characteristics.

Samples 7 and 8 use a level of ultrasonic energy about double that for electrophoresis, it is to be expected that this higher level of ultrasonic energy would reduce the dewatering effectiveness over that where the energy levels are approximately equal.

$W_R$ is calculated by dividing the additional water removed, over that by vacuum alone, by the total energy used. This method is applicable to other materials with characteristics similar to ceramic slurries.

Sewage and Antibiotic Sludges

EXAMPLE 6

The materials used here represented a mixture of sewage sludges and antibiotic sludges (fermentation sludges). The antibiotic sludges are those typically produced by fermentation processes in the pharmaceutical industry. For this example, the antibiotic sludges had been mixed with typical sewage sludges. Initial solids concentration in the sludges was 4% and sample size was 50 g. The frequency used for acoustical energy was 20,000 Hertz. The voltage for electrophoresis was 50 V. Except for Sample 2 which was 25 V. As in Example 5 ultrasonic energy was not applied until the sludge had begun to form a cake.

In Examples 5-8 the pH of the materials was monitored and was noted to increase slightly during the dewatering process. The material was adjusted to low, neutral, and high pH at the start of the dewatering process. From this it was determined that best results were obtained when the initial pH was about 7.0.

Table VI lists results for vacuum (V) (Sample 1) vacuum and electrophoresis (E) (Samples 2-3) and the combination vacuum, electrophoresis (E) and ultrasonic (U) dewatering (Sample 4). The figures given are those where it was determined that the dewatering rate had reached an asymptote and no further water could be removed.

In this example ultrasonic data is not listed since no dewatering was obtained with a vacuum and ultrasonics alone. The combination of vacuum, electrophoresic, and ultrasonic dewatering means gave a higher total solids content that either electrophoretic or ultrasonic means, also the same energy levels would give a higher solids content for the combination of electrophoretic and acoustic means over either alone. Finally, for incremental water removal $W_R$, each milliliter of water removed for the combination required less energy than either electrophoretic means or ultrasonic means alone.

This method is applicable to waste activated sludges, anaerobic and secondary sludges as well as microbial sludges obtained by fermentation processes.

Protein Hydrolysate

EXAMPLE 7

A protein hydrolysate sludge (containing the valuable product in the supernatant) was used for Example 7 that is typical of products obtained from digestion of for example soybean meal. The product contains a complex mixture of proteins and polysaccharides. The hydrolysate suspension is characterized by an initial suspended solids content of 15%. Sample size is approximately 50 g. The voltage during electrophoresis is listed in Table VII. Frequency of the ultrasonic energy applied was 20,000 Hertz. As in Example 5 ultrasonic energy was not applied until the hydrolysate had begun to form a cake.

The figures listed in Table VII are those where it had been determined that the dewatering rate had reached an asymptote and no further water could be removed. Table VII lists the solids content using a vacuum (V) only (Samples 1 and 2), a vacuum and ultrasonics (U) (Sample 3), a vacuum and electrophoresis (E) (Samples 4 and 5), and a vacuum and the combination of electrophoresis (E) and ultrasonics (U) (Samples 6-8). $CaCl_2$ was added to the suspension to improve the dewatering characteristics but had no noticeable effect. There is some evidence in the literature that calcium ions bind to the proteins and might release the water bound between the protein chains.

It is apparent from the data in Table VII that by the use of a combination of electrophoresis and acoustics a higher total solids content can be achieved. Further, the same energy levels give a higher solids content for the combination than either electrophoresis or ultrasonics alone would. Finally, for incremental water removal $W_R$, each milliliter of water removed for the combination required less energy than the use of either electrophoretic or acoustic means alone. In fact, the use of ultrasonic means alone was detrimental in that it did not improve the dewatering characteristics.

Samples 6 and 7 that use much higher levels of ultrasonic energy show reduced dewatering efficiency over that of Sample 8 where the energy levels for electrophoresis and ultrasonics are more equal.

It is noted that the efficiency of water removal as shown by $W_R$ is very high for Sample 4 with a value of 12.1 ml removed per watt hour. However, a level of only 53.2% solids could be reached making the use of electrophoresis alone not much better than the use of a vacuum only. It is expected that the combination of electrophoretic and ultrasonic means would give still higher efficiencies when the material is only dewatered by 2-3% as in Sample 4. Since each further milliliter of aqueous product (protein) removed requires more energy than the previous one, the efficiency values will be lower for a solids content of about 60% compared to a final solids content of about 50%.

The greatest advantage of the invention, in addition to higher efficiency, is the much higher separation of solids from liquid resulting in a much more valuable product or recovering more product that had previously been lost.

This method is applicable to food and pharmaceutical products where thermal techniques cannot be used due to heat sensitivity and where valuable products soluble in water are left in the cake. Efficient recovery of the supernatant is possible by this technique. The method is further applicable to materials with characteristics similar to protein hydrolysates.

TABLE V

| | CERAMIC SLURRY | | | | | |
|---|---|---|---|---|---|---|
| Sample | Vacuum (cm Hg) | E (Watt Hours) | U (Watt Hours) | Energy Total (Watt Hours) | Moisture Percent (Solids) | $W_R$ ML Energy |
| 1 | 38 | — | — | — | 55 | — |

TABLE V-continued
CERAMIC SLURRY

| Sample | Vacuum (cm Hg) | E (Watt Hours) | U (Watt Hours) | Energy Total (Watt Hours) | Moisture Percent (Solids) | $W_R$/ML Energy |
|---|---|---|---|---|---|---|
| 2 | 38 | — | 4.17 | 4.17 | 54 | — |
| 3 | 38 | 5 | — | 5 | 56 | 0.18 |
| 4 | 38 | 4.17 | — | 4.17 | 57 | 0.41 |
| 5 | 38 | 3.75 | — | 3.75 | 58 | 0.68 |
| 6 | 38 | 3.17 | — | 3.17 | 55.5 | 0.08 |
| 7 | 38 | 2.23 | 3.33 | 5.57 | 64 | 1.24 |
| 8 | 38 | 1.67 | 3.33 | 5.00 | 60 | 0.82 |

TABLE VI
SEWAGE AND ANTIBIOTIC SLUDGE

| Sample | Vacuum (cm Hg) | E (Watt Hours) | U (Watt Hours) | Energy Total (Watt Hours) | Moisture Percent (Solids) | $W_R$/ML Energy |
|---|---|---|---|---|---|---|
| 1 | 38 | — | — | — | 25.7 | — |
| 2 | 38 | 3.60 | — | 3.60 | 36 | 0.59 |
| 3 | 38 | 5.67 | — | 5.67 | 34 | 0.32 |
| 4 | 38 | 5.5 | 5 | 10.5 | 45 | 0.31 |

TABLE VII
PROTEIN HYDROLYSATE

| Sample | Vacuum (cm Hg) | E Volts | E (Watt Hours) | U (Watt Hours) | Energy Total (Watt Hours) | Moisture Percent (Solids) | $W_R$/ML Energy |
|---|---|---|---|---|---|---|---|
| 1 | 38 | — | — | — | — | 50 | — |
| 2 | 38 | — | — | — | — | 51 | — |
| 3 | 38 | — | — | 8.33 | 8.33 | 31.9 | Negative |
| 4 | 38 | 1 | 0.125 | — | 0.125 | 53.2 | 12.1 |
| 5 | 38 | 5 | 1.04 | — | 1.04 | 53 | 1.34 |
| 6* | 38 | 3.5 | 0.245 | 2.917 | 3.16 | 61 | 1.62 |
| 7* | 38 | 3.5 | 0.546 | 3.333 | 3.88 | 62 | 1.42 |
| 8 | 38 | 10 | 0.375 | 0.50 | 0.875 | 61.4 | 6.03 |

*$CaCl_2$ added.

What is claimed is:

1. A method of dewatering a suspension comprising:
   a. subjecting the suspension to an acoustical field at a frequency and amplitude adapted to cause separation in water bound to particles in the suspension;
   b. concurrently subjecting the suspension to an electrical field adapted to cause a migration of water and of particles resulting in a portion of the suspension having an increased concentration of particles and another portion having an increased concentration of water; and
   c. removing water from the portion of the suspension having an increased concentration of water.

2. The method of claim 1 including applying a pressure differential to the portion of the suspension having an increased concentration of water whereby water removal is augmented.

3. The method of claim 1 employing an amount of energy for separating a unit of water from the suspension, which amount is less than would be required by use of an acoustical field alone to separate the unit of water.

4. The method of claim 1 employing an amount of energy for separating a unit of water from the suspension, which amount is less than would be required by use of an electrical field alone to separate the unit of water.

5. The method of claim 1 which includes applying an acoustical field subsequent to the practice of claim 1.

6. The method of claim 1 employing an aqueous coal slurry for the aqueous suspension.

7. The method of claim 1 whereby the aqueous suspension is dewatered by concurrently subjecting it to an acoustical field and an electrical field whose power levels are approximately equal.

8. The method of claim 1 employing an aqueous ceramic slurry for the aqueous suspension.

9. The method of claim 1 employing an aqueous sewage and antibiotic sludge for the aqueous suspension.

10. The method of claim 1 employing an aqueous protein hydrolysate sludge for the aqueous suspension.

11. A method of dewatering an aqueous suspension comprising:
    a. flowing the suspension into a dewatering zone;
    b. subjecting the suspension to an acoustical field at an amplitude and frequency adapted to cause a separation of water bound to particles in the suspension;
    c. concurrently subjecting the suspension to an electrical field adapted to cause a migration of particles toward one portion of the zone and to cause a migration of water toward another portion of the zone; and
    d. removing water from the portion of the dewatering zone toward which water is migrating.

12. The method of claim 11 including applying a pressure differential at the portion of the zone toward which water is migrating whereby water removal is augmented.

13. The method of claim 11 employing an amount of energy for separating a unit of water from the suspension, which amount is less than would be required by use of an acoustical field alone to separate the unit of water.

14. The method of claim 11 employing an amount of energy for separating a unit of water from the suspension, which amount is less than would be required by use of an electrical field alone to separate the unit of water.

15. The method of claim 11 which includes applying an acoustical field subsequent to the practice of claim 11.

16. The method of claim 11 employing an aqueous coal slurry for the aqueous suspension.

17. The method of claim 11 whereby the aqueous suspension is dewatered by concurrently subjecting it to an acoustical field and an electrical field whose power levels are approximately equal.

18. The method of claim 11 employing an aqueous ceramic slurry for the aqueous suspension.

19. The method of claim 11 employing an aqueous sewage and antibiotic sludge for the aqueous suspension.

20. The method of claim 11 employing an aqueous protein hydrolysate sludge for the aqueous suspension.

21. A method of dewatering an aqueous suspension in a dewatering chamber with an inlet and discharge outlet, and having two electrodes, one of which is water permeable, forming opposing walls of the dewatering chamber which method comprises:
    a. flowing the suspension into the dewatering chamber and between the two electrodes;
    b. applying an acoustical field to the suspension at a frequency and amplitude adapted to separate water bound to suspended particles in the suspension;

c. applying an electrical field concurrently with step b between the two electrodes adapted to cause the suspended particles to migrate away from the water permeable electrode and water toward the permeable electrode;
d. concurrently with step c removing water from the suspension through the water permeable electrode; and
e. removing the dewatered suspension from the dewatering chamber.

22. The method of claim 21 including applying a pressure differential to the portion of the suspension having an increased concentration of water whereby water removal is augmented.

23. The method of claim 21 employing an amount of energy for separating a unit of water from the suspension, which amount is less than would be required by use of an acoustical field alone to separate the unit of water.

24. The method of claim 21 employing an amount of energy for separating a unit of water from the suspension, which amount is less than would be required by use of an electrical field alone to separate the unit of water.

25. The method of claim 21 which includes a dewatering of the dewatered suspension by a subsequent applying of an acoustical field.

26. The method of claim 21 employing an aqueous coal slurry for the aqueous suspension.

27. The method of claim 21 whereby the aqueous suspension is dewatered by concurrently subjecting it to an acoustical field and an electrical field whose power levels are approximately equal.

28. The method of claim 21 wherein the applying of the acoustical field is at a frequency of about 5000 to 40,000 Hertz and at an amplitude of about 0.002 to 0.01 millimeters.

29. The method of claim 21 including adding a surface modifier to the slurry before or as the suspension is flowing into the dewatering chamber.

30. The method of claim 21 employing an aqueous ceramic slurry for the aqueous suspension.

31. The method of claim 21 employing an aqueous sewage and antibiotic sludge for the aqueous suspension.

32. The method of claim 21 employing an aqueous protein hydrolysate sludge for the aqueous suspension.

* * * * *